Jan. 6, 1970     U. LA ROCHE     3,488,512
SHUTTER FOR INCREASING THE CONTRAST OF MOIRE PATTERNS
Filed Dec. 5, 1967     2 Sheets-Sheet 1

INVENTOR
ULRICH LAROCHE

ATTORNEY

United States Patent Office 3,488,512
Patented Jan. 6, 1970

3,488,512
SHUTTER FOR INCREASING THE CONTRAST OF MOIRE PATTERNS
Ulrich La Roche, Zurich, Switzerland, assignor to Contraves AG, Zurich, Switzerland
Filed Dec. 5, 1967, Ser. No. 688,259
Claims priority, application Switzerland, Dec. 7, 1966, 17,497/66
Int. Cl. H01j 39/12, 3/14, 5/16
U.S. Cl. 250—237
5 Claims

ABSTRACT OF THE DISCLOSURE

A moiré pattern is generated by relative motion between two superimposed sets of grating lines of slightly different grating constant. Light from an illumination source passes through the two sets of grating lines and is received by a photocell which furnishes the signals signifying the relative motion of the two members. The illumination source has a plane of symmetry arranged in a direction parallel to the grating lines. The intensity of light on the surface of the source of illumination decreases from the major plane of symmetry outwards, thus eliminating unwanted diffraction effects and increasing the contrast in the Moiré patterns.

BACKGROUND OF THE INVENTION

This invention relates to a system for generating signals signifying the relative movement of a first and second member. In particular it relates to a system for generating said signals by means of the relative movement of a first and second set of grating lines respectively affixed to said first and second members, said first and second set of grating lines having either slightly different grating constants or slightly different orientations. The two sets of grating lines are superimposed in such a manner that said lines are substantially in parallel. A source of illumination is used to transmit light through the two superimposed sets of grating lines, light from said illumination source forming moiré patterns after passage through said sets of grating lines if said grating lines are moved relative to each other. The moiré patterned light is received by a photocell. The output signals from the photocells represent the distances which one member has moved relative to the other member.

The accuracy of measurement which may be obtained by the above mentioned method is greater, the smaller the difference in the grating constant or the difference in orientation. For precision measurements, the two sets of grating lines, which are on respective transparent bases, are superimposed and, as mentioned above illuminated by a light source, thus forming moiré patterns on the side of the gratings which is removed from said light source. These moiré patterns may then be evaluated by photoelectric means. Of course, these arrangements are not limited to linear measurements, but may be considered as divisions of arc for the measuring of angles of rotation.

The precision of the measurement may be increased by decreasing the distance between consecutive grating lines. Thus each requirement for increased precision of measurement leads to an increase in the number of grating lines per unit length or per unit arc. However, there are limits to the precision obtainable by these means. If the distance between the lines approaches the order of magnitude of the distance between lines in diffraction gratings, diffraction effects enter which decrease the light-to-dark contrast in the moiré patterns, thus decreasing the precision with which these patterns can be read, and, in particular, evaluated by means of photoelectric elements.

SUMMARY OF THE INVENTION

This invention thus comprises a system for generating signals as a function of the relative motion between a first and a second member. The system comprises a first set of optical grating lines having a first grating characteristics affixed to said first member, and a second set of optical grating lines having a second grating characteristic affixed to said second member. Said second grating characteristic differs slightly from said first grating characteristic. Furthermore said first and second sets of grating lines are superimposed upon each other in such a manner that said first set of grating lines and said second set of grating lines extend in substantially the same direction. Said two sets of grating lines are illuminated by a source of illumination having a plane of symmetry, said plane of symmetry being arranged to extend in substantially the same direction as said sets of grating lines, light from said illumination source forming moiré patterns after passage through said sets of grating lines if said grating lines are moved relative to each other. Photoelectric means are provided for receiving said moiré patterned light, said photoelectric means thus generating signals which are a function of the relative motion of said first and second members. Furthermore, illumination intensity modifying means are provided for varying the intensity of illumination of said source of illumination in such a manner that it decreases outwards from said plane of symmetry, said decrease of illumination intensity causing a decrease in the number of secondary diffraction maxima and in a consequent increase in modulation contrast obtainable from said moiré patterns. This is particularly important when a plurality of adjacent relatively narrow photocells are used to measure individual moiré lines.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
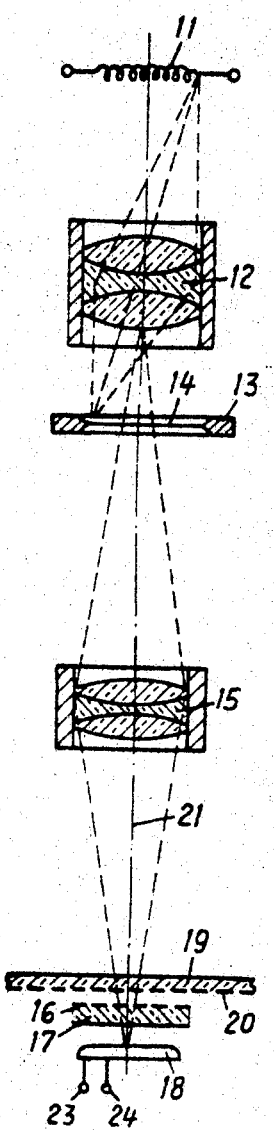
FIG. 1 is a schematic diagram showing the optical arrangement for illumination of the sets of grating lines and a photocell for evaluation of the moiré lines.

As shown in FIG. 1, the system according to this invention comprises a source of illumination, here a filament 11. This filament is, of course, adapted to be connected to a voltage source (which is not shown herein) and is further housed in a housing which is either evacuated or filled with a protective gas. The system further comprises a condenser 12 in turn consisting of a plurality of lenses, and a shutter 13 having a slot 14 situated in the plane of the paper, and an objective 15 also consisting of a plurality of lenses. The system further comprises a glass plate 17, having a stationary set of grating lines 16. A photocell 18 is situated on the side of glass plate 17 opposite the side having the set of grating lines. Photocell 18 has two contacts 23 and 24 from which the photocell output signal may be obtained. These photocell output signals constitute the signals representing the relative motion of first and second members, which in this case are glass plate 17 and a second glass plate 19 which has a set of grating lines 20, here called the second set of grating lines, on the side facing the glass plate 17. This circular glass plate 19 may be rotated about an axis parallel to the optical axis 21. This axis of rotation is not illustrated. It is situated at a distance out of the plane of the drawing in such a way that the edge of circular glass plate 19, which carries said second set of grating lines, is situated over the first set of grating lines 16 of glass plate 17. The filament 11, condenser 12 and shutter 13 are arranged in such a manner that the condenser projects the image of the filament onto the slot 14 in the shutter. This slot is situated in the same direction as the filament. The shutter 13 and the objective 15 are so arranged that said objective projects said illuminated slot 14 to infinity, that is a parallel bundle of light rays corresponding to said slot passes through the two sets of grating lines 20 and 16 and impinges upon the photocell 18. In order to achieve this, the filament 11, as well as slot 14, and the sets of grating lines 20 and 16 must, as opposed to the representation in FIG. 1, extend in the same direction. In FIG. 1 the filament and the slot were rotated by 90° relative to the sets of grating lines, in order to achieve a better pictorial representation. In order to achieve an optimal illumination of photocell 18, the distance between the condenser 12 and the objective 15 and photocell 18 is so chosen that the objective projects the output of the condenser onto the photocell.

Figure 2:
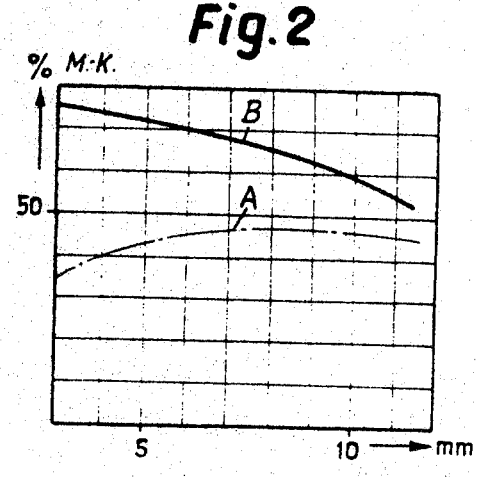
FIG. 2 is a graphical representation of measured modulation contrast as a function of distance between said photocell and said grating lines for both a conventional system and a system according to this invention.

For the measurements to be described below an objective having a focal length of 50.8 millimeters, sets of grating lines with divisions whose periods are 10 microns and a photocell having a 1 mm. slot situated parallel to the grating lines, were used. As soon as the slot 14 is illuminated by filament 11 a sequence of moiré lines is impinged upon the photocell 18. The position and period of said moiré lines depend upon the type of grating 16 and 20 and their relative depositions. For the curve A in FIG. 2, a shutter having a slot of 250 microns width was used. As curve A shows, under the above conditions the modulation contrast of this moiré pattern is a function of the distance between the photocell 18 and the set of grating lines 16 and does not reach the value of 50% even for the most favorable case. This modulation contrast is determined from the maximum and minimum photocell illumination ($S_{max.}$ and $S_{min.}$, respectively) according to the following equation:

$$M = \frac{S_{max.} - S_{min.}}{S_{max.} + S_{min.}}$$

The cause for this relatively low maximum modulation contrast, as well as for the dependence of said modulation contrast on the distance between the gratings and the photocell was recognized to be the secondary maxima generated by the diffraction of the light.

Figure 3:
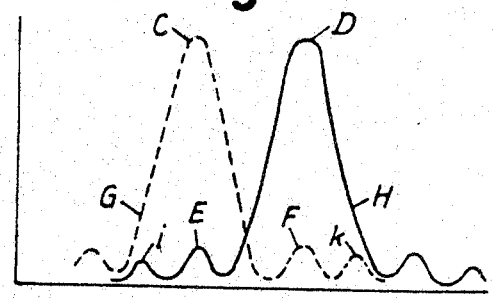
FIG. 3 is a schematic representation of the intensity of illumination of the image of two adjacent areas of a diffraction grating and the interaction of said two images.

FIG. 3 is a schematic representation of the brightness of two adjacent slot images. In the case shown in this figure, the brightness maxima C, D of the two adjacent slot images are superimposed upon secondary maxima E and F, respectively. The secondary maxima are phase-shifted relative to the primary maxima by a half wave length, thus resulting in a weakening of said primary brightness maxima C and D. Furthermore, in-phase secondary maxima I, K are superimposed on the sides of the primary maxima, which results in a broadening of the tops. Although only two adjacent slot images are illustrated here, it has been found that in practice each slot image is effected at least by both adjacent slot images in the above-mentioned manner. The superposition of the secondary maxima thus results in a lessening of the obtainable contrast.

Figure 4:
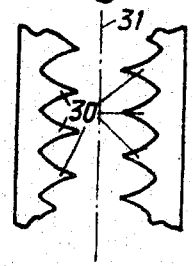
FIG. 4 is a greatly magnified portion of a plan view of an illumination slot according to this invention.

Starting with the known fact that a decrease of intensity of higher diffraction orders of a diffraction grating may be used for the determination of lack of sharpness of the edges of an illumination slot, a slot as illustrated in FIG. 4 was substituted for the conventional slot 14. As shown in FIG. 4, the sides of the slot extending in the direction of the major plane of symmetry 31 are equipped with serrations 30 extending in a direction perpendicular to the direction of said major axis 31. These serrations 30 have such a form that the light conductivity of this slot measured perpendicular to said major plane of symmetry 31 follows a Gaussian error distribution whose width corresponding to half the maximum intensity is measured between said major axis 31 and the deepest penetration between adjacent teeth. For the purposes of this illustration this was taken to be 200 microns. The above-described measurements were repeated with the here-described slot serving as a source of illumination. A number of points corresponding to curve B in FIG. 2 was found. As a comparison of two curves A and B will show, it is thus possible to increase the obtainable modulation contrast very greatly, particularly when the distance between the sets of grating lines 16 and the photocell 18 is small.

Figure 5:
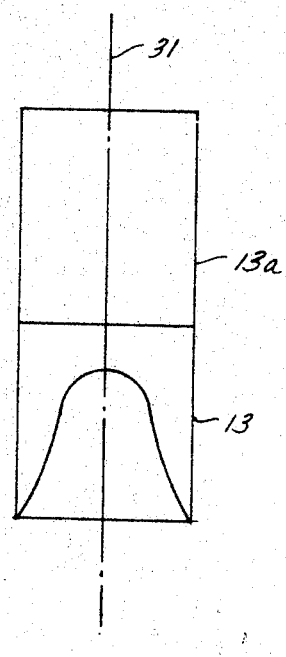
FIG. 5 shows an alternate arrangement to the slot of FIG. 4.

The invention is of course not limited to the use of a serrated slot as shown in FIG. 4. For example, as shown in FIG. 5, a conventional slot having a surface with equal light transmissivity throughout may be used in conjunction with a plate or diaphragm, here denoted diaphragm 13a, having different coefficients of light absorption. The differences in light absorption of said plate must be such that the illumination density of the slot perpendicular to the major plane of symmetry decreases in the direction of both sides edges. It is immaterial whether this plate precedes or follows the slot when viewed in the direction of the light. Also, the slot used as source of illumination must not necessarily have the form of a rectangle, but may also have an elliptic form or even a circular cross-section. It further makes no difference for the system according to this invention whether the set of grating lines which is closest to the photocell is the movable or the stationary set of grating lines.

While the invention has been illustrated and described as embodied in the system having a slot with serrated edges, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A system for generating signals as a function of relative motion between a first and a second member, comprising in combination a first set of optical grating lines having a first grating characteristic situated on said first member; a second set of optical grating lines having a second grating characteristic situated on said second member, said second grating characteristic differing slightly from said first grating characteristic, said first and second sets of grating lines being superimposed upon each other in such a manner that said first and second grating lines extend in substantially the same direction; means for effecting relative movement between said first and second members; a source of illumination having an optical plane of symmetry, said optical plane of symmetry being arranged so as to extend in substantially the same direction as said sets of grating lines, light from said illumination source forming moiré patterns after passage through said sets of grating lines if said grating lines are moved relative to each other; photoelectric means adapted to receive said moiré patterned light; and means for decreasing the intensity of illumination of said illumination source outwards from said plane of symmetry said decrease of illumination resulting in suppression of secondary diffraction maxima and in a consequent increase in modulation contrast obtainable from said moiré patterns.

2. A system as set forth in claim 1 wherein said source of illumination is an illuminated rectangular slot, having an optical plane of symmetry extending along the lengthwise dimension of said slot; said slot having lengthwise edges extending in substantially the same direction as said plane of symmetry.

3. A system as set forth in claim 2 wherein said means for decreasing said illumination comprise serrations on said lengthwise edges of said slot.

4. A system as set forth in claim 2 wherein said means for decreasing said illumination comprise a plate adapted to be used in conjunction with said slot, and having a light absorption characteristic which is a minimum at locations coinciding with said optical plane of symmetry and increases in a direction perpendicular to said optical plane of symmetry and extending towards said edges.

5. A system as set forth in claim 1 wherein said means for decreasing said intensity of illumination in said specified direction comprise means for decreasing said intensity of illumination in accordance with a Gaussian error curve.

References Cited

UNITED STATES PATENTS

| | | | |
|---|---|---|---|
| 2,380,666 | 7/1945 | Morrison | 350—271 |
| 2,886,718 | 5/1959 | Shepherd et al. | 250—220 |
| 3,070,700 | 12/1962 | Budnick | 250—237 X |
| 3,153,111 | 10/1964 | Barber et al. | 356—169 |
| 3,216,318 | 11/1965 | Gaffard | 356—106 X |
| 3,232,165 | 2/1966 | Dupuy et al. | 356—111 |

JAMES W. LAWRENCE, Primary Examiner

V. LAFRANCHI, Assistant Examiner

U.S. Cl. X.R.

250—217; 356—111, 169